UNITED STATES PATENT OFFICE.

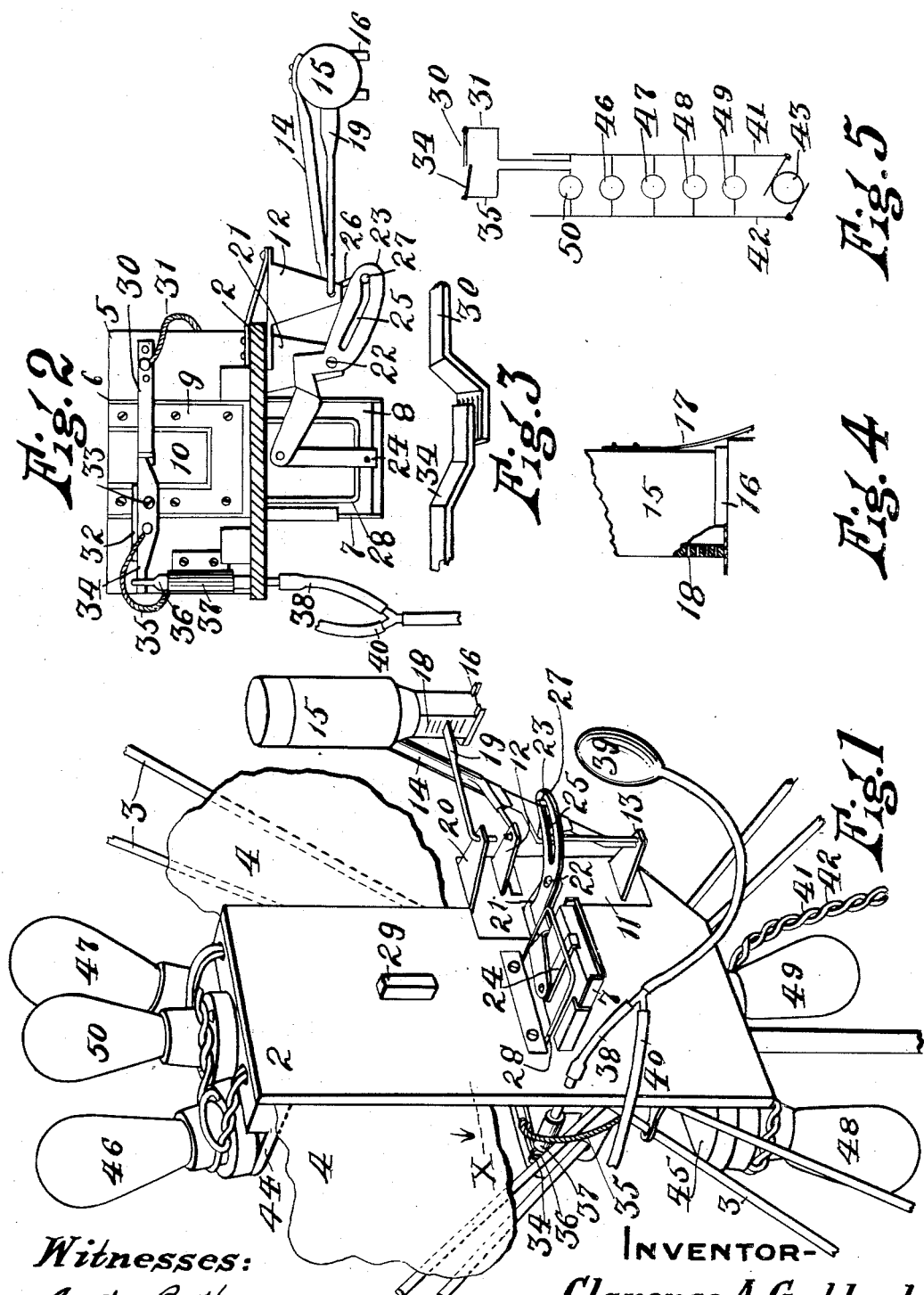

CLARENCE A. GODDARD, OF AKRON, OHIO.

FLASH-LIGHT APPARATUS FOR PHOTOGRAPHY.

1,049,077. Specification of Letters Patent. Patented Dec. 31, 1912.

Application filed September 23, 1912. Serial No. 721,816.

*To all whom it may concern:*

Be it known that I, CLARENCE A. GODDARD, a citizen of the United States, residing at Akron, in the county of Summit and State of Ohio, have invented new and useful Improvements in Flash-Light Apparatus for Photography, of which the following is a specification.

This invention relates, broadly, to devices for making flash-light pictures, and has especial relation to apparatus for producing the flash necessarily employed in making the photograph.

The object of the invention is to produce an apparatus embodying a cabinet within which the flash is produced so that the fumes incident to the flash are prevented from escaping into the room, thereby enabling the device to be used in galleries without rendering the air obnoxious to the occupants.

A further incident to the invention is to produce a cabinet having a translucent front through which the light passes for making the photograph and also contemplates the provision of a rear wall for said cabinet to which are secured a plurality of electric or other lights which may be utilized for furnishing suitable light to the photographer for obtaining the necessary focus so that when the flash occurs the subject of the picture is properly posed.

A still further and primary object of this invention is to provide a magazine supply for repeated flashes, and means to receive the successive charges of flash-powder from the magazine and shift them into the cabinet from the exterior and fire them simultaneously with the opening of the shutter of the camera lens to thereby provide a device which may be repeatedly used and one in which the certainty of operation of the device is insured with the simultaneous opening of the camera shutter, the flash used for producing the picture occurring absolutely simultaneously with the exposure of the plate.

A still further object of this invention is to provide mechanism whereby repeated charges of flash-powder may be successively used in the device, each of which may be measured and determined as to quantity and in which the flash is produced within the cabinet while the magazine containing the flash-powder is always without the cabinet, to thereby enable the operator to repeatedly use the device without opening the cabinet to permit the escape of the noxious vapors into the gallery of the photographer. Suitable mechanism for producing the foregoing results is an essential feature of this invention.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1, is a view of a flash-light cabinet showing the mechanism embodying this invention in perspective, and with portions of the cabinet broken away to better illustrate the mechanism thereof; Fig. 2, is a sectional view approximately on line X of Fig. 1; Fig. 3, is a detail of the spark-producing fingers; Fig. 4, is a detail of the lower end of the flash-powder-containing magazine; and, Fig. 5, is a diagrammatic view of the wiring and electric circuits employed.

Referring to the drawings in detail, the cabinet is usually a self-supporting structure, and embodies an upright standard 1 to which is secured a plate 2 forming a portion of the back of the cabinet. Secured to the front face of the plate 2 are arms 3 radiating in various directions to support a canvas box 4 which incloses all of the mechanism positioned in front of the plate 2. These cabinets are of ordinary construction and may be constructed of metal or wood in place of the canvas, but as the general construction of the cabinet forms no part of this invention a further illustration of the cabinet is believed to be unnecessary, excepting that the cabinets of this character are always provided with a front wall of translucent material, through which the light used for properly focusing the subject and the light produced by the flash passes for making the photograph. Extending into the cabinet and supported by the plate 2 opposite a suitable opening therein is a shelf 5 provided with ways 6. Extending rearwardly from the plate 2 are a pair of ways 7 forming a continuation of ways 6 formed in the shelf 5. Slidably mounted in the ways 6 and 7 is a transversely-shiftable member 8 the inner portion of which is covered with metal and constitutes a flash-pan 9. This flash-pan 9 is provided with a depression or recess 10 in which the powder to produce the flash is deposited and in which it is ignited when the member 8 is in the position shown in the drawings.

The mechanism for shifting the position of the flash-pan 9 and loading the same with flash-powder embodies the following mechanism. Secured to the rear face of the plate 2 is a plate 11 from which projects a pair of brackets 12 and 13 provided with apertures constituting bearings in which are pivotally-mounted the extended arms of an inclined supporting member 14, to permit the latter to swing, with the apertures in the members 12 and 13 as centers. Secured to the outer free end of the supporting member 14 is a magazine 15 embodying a cup-shaped receptacle within which is placed a supply of flash-powder. The lower end of this magazine 15 is provided with a gate 16 normally held in its closed position through the medium of a spring 17 (see Fig. 4) for preventing the escape of the powder held in the magazine 15. Various means may be employed for controlling the amount of powder used for each flash but a preferred form consists in providing one of the faces of the lower end of the magazine 15 with a plurality of slots 18 which are adapted to receive the flattened end of a gate 19 pivotally mounted on a bracket 20 on the plate 11, and mounted eccentrically with respect to the apertures in the brackets 12 and 13 so that as the supporting arm 13 is revolved the flattened end of the gate 19 will enter one of the slots 18 and cut off the further descent of the powder in the magazine whenever the gate or valve 16 is opened to thereby prevent waste of the flash powder.

The arrangement of this device is such that when the parts are in the position shown in Fig. 1, the gate 19 will be in its inoperative position permitting a descent of the powder from the magazine 15 onto the gate 16, and when the magazine 15 is swung to its operative or discharging position the gate 19 will extend across the discharge end of the magazine and cut off the supply, thus regulating the charge between it and the gate 16.

Extending rearwardly from the plate 11 is an ear 21 provided near its outer end with a pivot 22 on which is mounted an oscillatory arm 23 one end of which is pivotally united with a link 24. The opposite end of the latter is connected with the rear end of the member 8. The opposite end of the rocking-arm 23 is provided with a curvilinearly-formed slot 25. Secured to the arm 14 is a rearwardly-extending arm 26 provided with an upturned pin 27 adapted to be received in the slot 25 and arranged to oscillate the arm 23 when the arm 14 carrying the magazine 15 is shifted toward the member 8. Secured to the plate 2 is a tappet 28, adapted to lie above the member 8 and in the path of the lower end of the gate 16 so that when the magazine is shifted toward the member 8, the tappet-arm 28 engages the rear depending portion of the gate 16, and overcoming the spring 17 will move the gate 16 to its open position thereby permitting a discharge of the charge in the magazine which is contained below the regulating or controlling-gate 19. When the magazine 15 is shifted to the position adjacent to the rear face of the member 2 the pin 27 running in the slot 25 will oscillate the arm 23 thereby drawing the flash-pan 9 rearwardly of the plate 2 and into a position to receive the charge of flash-powder from the lower end of the magazine 15. The inward movement of the magazine 15 is arrested by an abutment or stop 29. As before described, as the magazine is shifted to a position to encounter the abutment 29 the gate 16 is moved to its open position and a charge of flash-powder is placed in the receptacle 10, while the latter is in its rear position and outside of the cabinet. As soon as this is accomplished, the magazine is swung to the position shown in Fig. 1, causing a reverse oscillation of the arm 23 which returns the flash-pan 9 to its firing position within the cabinet and at the same time, causes the regulating-gate 19 to move to its open position to permit a further descent of the powder in the magazine onto the gate 16, which being released from the engagement of the tappet 28, is moved to its closed position.

The parts now being in the position shown in the drawings with a charge of flash-powder in the receptacle 10 of the flash-pan 9, the following means are employed for igniting the flash-powder and opening the shutter of the camera. This consists of the following mechanism: Secured to the shelf 5 is a terminal 30 of a spark-producing circuit-breaker, to which an electric current is conveyed through the medium of a wire 31. The inner end of the member 30 is preferably corrugated and downwardly-bent to lie immediately above the face of the receptacle 10. Mounted on the outer side of the shelf is a standard 32 pivotally secured to which, through the medium of a pin 33, is a rocking-arm 34, the inner lower face of which is downwardly-bent, corrugated and positioned to engage the corrugated face of the inner end of the member 30. The member 34 constitutes the other element of the circuit-breaker and is connected with the electric circuit through the medium of a wire 35. The oscillating of the member 34 of the spark-producing circuit-breaker is produced through the medium of a longitudinally-shiftable piston 36 the end of which is slotted to receive the end of the member 34, and is contained in a cylinder 37 to which a supply of air for causing shifting movements of the piston is conveyed through a duct, such as a rubber hose, 38, connected with a bulb 39. I preferably provide the duct 38 with a branch 40 which leads to the camera shutter so that as the bulb 39 is compressed for operating the arm 34 to cause a spark a simultaneous movement of the camera shutter takes place.

As an element of this invention, an electric circuit is employed to produce the spark and is conveyed by the wires 41 and 42 from a source of supply 43.

In order to obtain light sufficient for focusing the camera on a subject I preferably provide upper and lower supports 44 and 45 secured to the plate 2 and within the confines of the cabinet. Mounted on the upper support 44 are a pair of electric lights 46 and 47 and on the lower support are a pair of electric lights 48 and 49. These lights are adapted to burn constantly and throw sufficient light through the translucent front wall of the camera to enable the photographer to properly view the subject and obtain the necessary focus of his camera. In order to protect these lamps and prevent the burning of the fuse when the spark is produced I also employ another lamp 50 which may be placed between the lamps 46 and 47 and of considerably less candle power. I connect the lamp 50 in the circuit of the wires 31 and 35 leading to which are the spark-producing terminals 30 and 34 so that the spark produced by the movement of these two terminals will be protected by the lamp 50.

The operation of the device is believed to be clear from the foregoing description, but as a further aid to the reader it will be stated that the subject is placed in front of the camera within range of the lights from the lamps 46, 47, 48 and 49 passing through the translucent front wall of the cabinet and the camera is properly focused to give the desired impression on the plate. The magazine 15 is swung to its discharging position over the withdrawn flash-pan 9 and a charge of flash-powder is deposited therein after which the magazine is restored to its inoperative position as shown in the drawings. The camera and the flash-light now being ready, the photographer can watch the subject and when the latter is ready the photographer compresses the bulb 39 sending a current of air through the tubes 38 and 40, which simultaneously operates the igniting device near the powder and the camera shutter, so that the flash takes place simultaneously with the opening of the camera shutter and of course, a release of the bulb closes the shutter. The fumes produced by the ignition of the flash-powder are confined within the cabinet and a second exposure may be made at once, all that is necessary being to replace the plate in the camera and to swing the magazine to its discharging position and return it to its inoperative position. This device provides means for making flash-lights in galleries where the fumes would be obnoxious, if not confined, and also enables the photographer to take pictures repeatedly and rapidly without the necessity of opening the cabinet to ascertain if there is material in the pan.

I claim:

1. A flash-light device comprising a cabinet provided in one wall thereof with an aperture, a flash-pan adapted to pass back and forth through said aperture, means for charging said flash pan with a flash powder while outside of said cabinet, means for firing the charge of flash-powder in said pan while within said cabinet.

2. A flash-light cabinet provided in one wall thereof with an aperture, a flash-pan adapted to pass, shuttle-fashion, through said aperture, means for supplying a charge of flash-powder to said pan while outside of said cabinet, and means for igniting said charge of powder in said pan while within said cabinet.

3. A flash-light cabinet embodying a wall provided with an opening, a flash-pan adapted to pass, shuttle-fashion, through said opening, a magazine for containing flash-powder adapted to be brought into discharging relation with respect to said pan when outside of said cabinet, and means for igniting the flash-powder in said pan within said cabinet.

4. A flash-light cabinet comprising a wall provided with an aperture, a flash-pan adapted to pass, shuttle-fashion, through said aperture, a shiftable flash-powder magazine adapted to be brought into discharging relation with respect to said flash-pan for charging the latter outside of said cabinet, and means connecting said magazine and flash-pan for operating the latter, and means for igniting the flash-powder in said pan within said cabinet.

5. A flash-light cabinet embodying a wall provided with an aperture, a flash-pan adapted to pass, shuttle-fashion, through said aperture, a pivotally-mounted powder-containing magazine secured to said wall, and adapted to be brought into charging relation over said flash-pan, means connecting said magazine and flash-pan for moving the latter through said aperture outside of said cabinet to receive the charge from said magazine, said mechanism arranged to shift the flash-pan into said cabinet upon the return of said magazine to its inoperative position, and means for igniting said charge of flash-powder within said cabinet.

6. A flash-light cabinet embodying a wall provided with an aperture, a flash-pan adapted to move, shuttle-fashion, through said aperture, means for depositing a charge of flash-powder on said flash-pan, a sparking device positioned adjacent said flash-pan when the latter is within said cabinet, said means embodying an oscillating arm, means for operating said arm for producing said spark, means connecting said sparking means with the shutter of a camera whereby said spark-producing element is operated simultaneously with the opening of the shutter of the camera.

7. A flash-light cabinet embodying a wall provided with an opening, a flash-pan movable, shuttle-like, through said aperture, a pivotally-mounted magazine positioned outside of said cabinet arranged to discharge flash-powder into said flash-pan when outside of said cabinet, and mechanism connecting said magazine and flash-pan whereby the flash-pan is brought into charging relation with the former when outside of said cabinet, and means for igniting the charge of flash-powder when said flash-pan is within said cabinet.

8. A flash-light cabinet embodying a wall provided with an aperture, a flash-pan adapted to move shuttle-like, through said aperture, a shiftable magazine positioned outside of said cabinet and arranged to discharge into said flash-pan when the latter is outside of said cabinet, means connecting said magazine and flash-pan for operating the latter to swing it into position to receive the charge of flash-powder outside of said cabinet, means for regulating the charge of flash-powder from said magazine, and means for igniting said flash-powder contained in said pan within said cabinet.

9. A flash light cabinet embodying a wall provided with an aperture, a flash-pan adapted to move shuttle-wise, through said aperture, a shiftable magazine outside of said cabinet and arranged to discharge flash-powder into said pan while outside of said cabinet, a valve positioned in said magazine and arranged to be opened when said magazine is over said pan to discharge thereon, a second or charge-measuring valve arranged to be moved to its inoperative position when said magazine is moved to its inoperative position and means for firing the charge of flash-powder on said pan within said cabinet.

10. A flash-light cabinet embodying a wall provided with an aperture, a flash-pan adapted to move, shuttle-wise through said aperture, and to receive a charge of flash-powder outside of said cabinet and convey the same to the said cabinet, a spark-producing element arranged to fire the charge of powder on said pan, said spark-producing element embodying a member adapted to be operated simultaneously with respect to the opening of the shutter of a camera.

In testimony whereof I have hereunto set my hand in presence of two subscribing witnesses.

CLARENCE A. GODDARD.

Witnesses:
A. E. KLING,
C. E. HUMPHREY.